J. H. THRELKELD.
ANTISKID TIRE TREAD.
APPLICATION FILED AUG. 14, 1915.
1,196,314.
Patented Aug. 29, 1916.
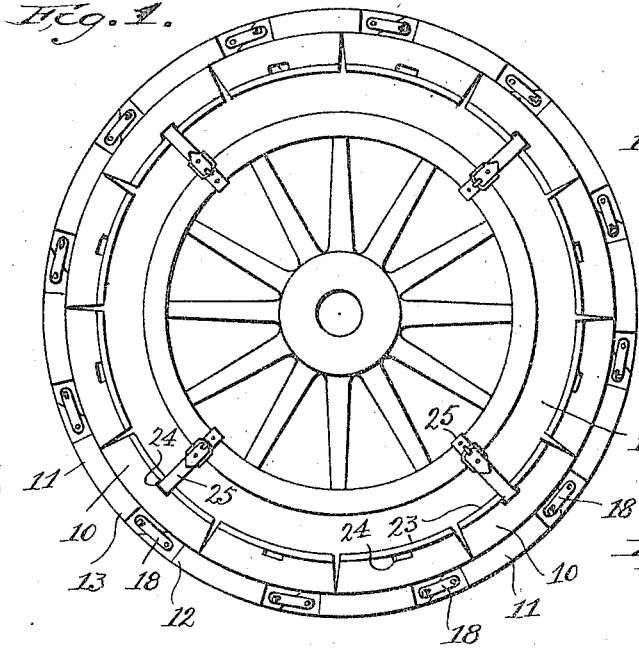
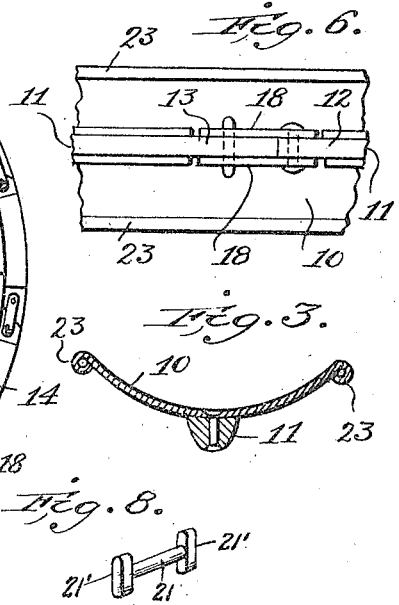
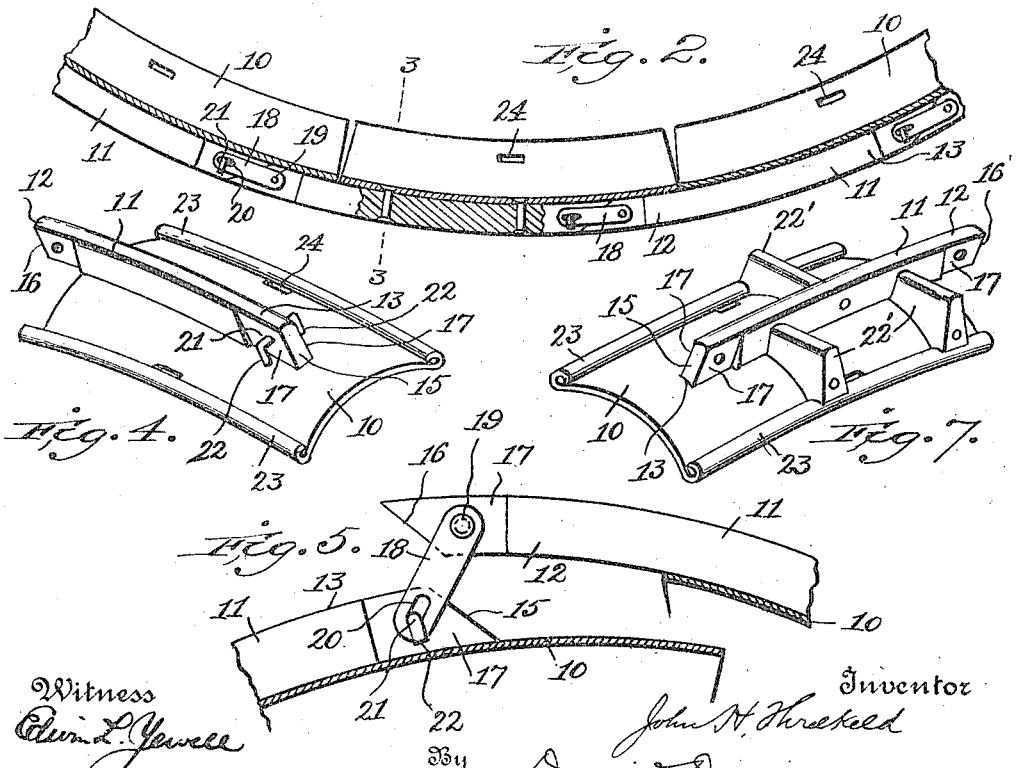
Witness
Inventor
John H. Threlkeld
By Davis & Davis
Attorneys

UNITED STATES PATENT OFFICE.

JOHN H. THRELKELD, OF CHARITON, IOWA.

ANTISKID TIRE-TREAD.

1,196,314.  Specification of Letters Patent.  Patented Aug. 29, 1916.

Application filed August 14, 1915. Serial No. 45,493.

*To all whom it may concern:*

Be it known that I, JOHN H. THRELKELD, a citizen of the United States of America, and a resident of Chariton, county of Lucas, State of Iowa, have invented certain new and useful Improvements in Antiskid Tire-Treads, of which the following is a full and clear specification.

This invention relates to improvements in that class of detachable treads for rubber tires wherein the same forms a combined armor and anti-slip to respectively prevent the puncturing and slipping of the tire on the roadway.

One of the particular objects of this invention is to provide a metal tread which is formed with casing-plate sections having an underlying rib and connecting said sections in a manner which will avoid a hinge movement at the juncture or adjacent edges of the casing-plates and providing substantially a rigid metal support outside of said adjacent edges.

Another object is to provide self-locking connections between the sections, so that by opening a single joint between any two of the sections, the tread can be removed from the tire.

These and other objects are attained by the means illustrated in the accompanying drawing, in which—

Figure 1 is a side elevation of an automobile wheel showing the improved tread applied around the periphery of the tire; Fig. 2 is an enlarged longitudinal sectional view of a portion of the improved tread; Fig. 3 is a cross-section on the line 3—3 of Fig. 2; Fig. 4 is a perspective view of one of the tread sections looking down on the tread surface thereof; Fig. 5 is an enlarged detail sectional view showing the manner of connecting the sections of the tread together; Fig. 6 is a plan view of one of the connections between the separate sections of the tread; Fig. 7 is a similar view to Fig. 4 showing a modified form of tread which is especially adapted for use on the rear or traction wheels of the vehicle; and Fig. 8 is a perspective view of a modified form of locking pin.

Similar reference numerals in all of the figures of the drawing designate like parts.

Broadly, the tread is formed of a plurality of sections connected together, with each section embodying a casing-plate 10 of any suitable non-puncturable material, and a metal tread-rib 11 formed integral with or secured to the outside thereof by rivets or in any suitable manner. This rib is preferably shaped in cross-section to form inclined sides, is relatively narrow compared to the width of the casing-plate, and extends longitudinally and centrally of said casing-plate. As shown clearly in Fig. 4 of the drawing, one end 12 of the rib projects beyond the corresponding edge of the casing-plate, and its opposite end 13 terminates short of the opposite edge of the casing-plate a distance equal to the projecting end, so that, when two or more sections are secured together, the joints between said casing-plates and said ribs will be staggered relatively to each other, as clearly shown in Figs. 1 and 2 of the drawing.

The casing-plates 10 are preferably formed of thin sheet metal, are bent transversely to conform to the periphery of the tire-casing 14, and are also bent longitudinally or shaped to curve around the tread of the tire-casing and extend somewhat on the sides thereof. Both ends 12 and 13 of the tread-ribs of each section are preferably beveled or inclined in the same direction, to provide inclined faces 15 and 16, which are adapted to contact with corresponding inclined faces on the ribs of the adjacent sections, so that the joints formed between the ribs of adjacent sections are inclined to the periphery of the tire. Both ends of the tread-ribs are also cut away or recessed to provide parallel vertical sides 17, to form flat connecting surfaces for the reception of the connecting links 18, which connect the beveled ends of adjacent ribs together to form a continuous metal tread. These links 18 can be secured to the ends of the ribs by bolts or rivets, but it is desirable to construct one end so that it will be detachable, as clearly shown in Fig. 5. One end of each of said links is pivotally attached by a rivet 19 to the projecting end 12 of the rib of one section, and is provided with a slot 20 in its opposite end which is adapted to engage the end of a pin 21 fixed in the end of the rib on the adjacent section. The pins 21 have their ends bent angularly toward the tire-embracing plates, as shown at 22 in Fig. 4, and the slots 20 in the links 18 extend longitudinally of said links. To engage said slotted ends of the links with the pins 21, it is necessary to turn the links at right angles to the ribs before the slots will pass over the bent ends or heads of said pins 21; then after the engagement the links can be turned in alinement with the ribs, which will automatically lock them in position and hold them locked until moved again to a vertical position.

The form of the sections thus far described (having only a longitudinal rib) is more particularly adapted for the front wheels of a motor vehicle, but for the rear or traction wheels the form shown in Fig. 7 is used. In this rear-wheel form, the identical structure of the front wheel sections is used together with transverse metal ribs 22′, the same being of like form in cross-section as the longitudinal ribs and are preferably of less height than said longitudinal ribs where they are connected thereto. These transverse ribs are substantially similar in shape to the longitudinal ribs to provide road-engaging edges which lie in a plane parallel with the axis of the vehicle axle, and they can be formed either integrally with the longitudinal ribs or separately and secured to said longitudinal ribs and casing-plates by rivets or otherwise.

As before mentioned, the casing-plates 10 are preferably formed of thin sheet metal, making them sufficiently resilient at their sides to give and bend with the tire-casing when it is depressed, and, to prevent cutting of the tire-casing, the longitudinal edges of the plates are curved or rolled as shown at 23. Each of the casing plates is provided with strap-apertures 24 adjacent their longitudinal edges and preferably back of the rolls or beads formed on the edges. These apertures are adapted to receive securing straps 25 which engage around the tire and rim of the wheel to retain the metal tread in position.

In operation, the length of the sections is proportioned to the circumference of the tire-casing they are intended for. I prefer to make them between 9 and 12 inches in length, so that, when a plurality of sections are joined together, they will form a ring of a circumference adapted to fit the inflated tire. To apply this metal tread, preferably the sections are joined together to form a ring and slipped over the periphery of a deflated tire, so that when the tire entirely is inflated it will tightly fit within the ring.

From the above description, it will be seen that a sectional metal tire tread is provided which has a road-engaging tread-ring that cannot be broken upwardly to any appreciable extent at its joints when engaged around a tire. This is secured by providing the ribs with the relatively wide casing-plates and fixing them to the ribs in a manner to stagger the joints of the plates and ribs and also beveling or overlapping the adjacent ends of the ribs, or, in other words, connecting the ends of the ribs together intermediate the ends of the casing-plates. It will be understood that the slight movement at the joints is obtained by the lost motion at the pivotal connections together with the resiliency of the casing-plates, thereby allowing the tread to give with the cushioning member so that it can perform its function.

This improved metal tread is especially adapted for use in mud, snow, or ice, and will effectually prevent skidding and slipping of the wheels, and, being constructed in sections, it is easily manufactured at a low cost, and, as the sections become worn or broken, they can be readily replaced without the use of special tools.

The modified form of pin 21 shown in Fig. 8, is provided with elongated heads 21′ at each end extending on both sides of the pin, instead of the single hooks shown in the remaining figures. It will also be understood that the rolled edges 23 of the plates (for preventing the cutting of the tires) can also be omitted without detracting from the successful operation of the device.

Having thus described my invention, what I claim is:

A metal tire tread for vehicles, comprising a plurality of independent sections connected together, each section embodying a casing-plate provided with a longitudinal tread rib having one end projecting beyond one edge of said plate and its opposite end terminating short of the opposite edge of said plate, the end faces of said rib being inclined to their periphery to form overlapping joints with adjacent ribs, and means for securing the ends of adjacent tread rib sections together.

In testimony whereof I hereunto affix my signature.

JOHN H. THRELKELD.

Witnesses:
   J. D. THRELKELD,
   S. A. THRELKELD.